(12) United States Patent
Gerber et al.

(10) Patent No.: US 8,606,290 B2
(45) Date of Patent: Dec. 10, 2013

(54) METHOD AND APPARATUS FOR PERFORMING A DEMOTION IN A CELLULAR COMMUNICATIONS NETWORK

(75) Inventors: Alexandre Gerber, Madison, NJ (US); Zhuoqing Mao, Ann Arbor, MI (US); Feng Qian, Ann Arbor, MI (US); Subhabrata Sen, New Providence, NJ (US); Oliver Spatscheck, Randolph, NJ (US); Zhaoguang Wang, Ann Arbor, MI (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 484 days.

(21) Appl. No.: 12/874,458

(22) Filed: Sep. 2, 2010

(65) Prior Publication Data
US 2012/0058773 A1 Mar. 8, 2012

(51) Int. Cl.
*H04W 72/00* (2009.01)
*H04W 4/00* (2009.01)
*H04B 1/38* (2006.01)
*G08C 17/00* (2006.01)

(52) U.S. Cl.
USPC ......... 455/452.2; 455/574; 370/311; 370/328

(58) Field of Classification Search
USPC ........ 455/450, 452.2, 453; 370/310, 311, 328
See application file for complete search history.

(56) References Cited

U.S. PATENT DOCUMENTS

| | | | |
|---|---|---|---|
| 2005/0080946 A1* | 4/2005 | Hosoya | 710/33 |
| 2011/0007682 A1* | 1/2011 | Islam et al. | 370/311 |
| 2011/0032868 A1* | 2/2011 | Huang et al. | 370/328 |

* cited by examiner

*Primary Examiner* — Wesley Kim

(57) ABSTRACT

A method, computer readable medium and apparatus for performing a demotion in a cellular communications network are disclosed. For example, the method receives a packet indicating that a batching transfer is completed, determines if a background packet was received after receiving the packet indicating that the batching transfer is completed and demotes a state of a state machine implemented by a radio network controller to a lower state if the background packet was not received.

20 Claims, 5 Drawing Sheets

METHOD AND APPARATUS FOR PERFORMING A DEMOTION IN A CELLULAR COMMUNICATIONS NETWORK

BACKGROUND

In a cellular communications network, for example a universal mobile telecommunications system (UMTS) 3G network, the cellular communications network introduces state machines for each user endpoint device which determines radio resource usage, device energy consumption and user experiences. The state machines can perform promotions or demotions to and from various states of the state machines. However, the promotions or demotions can create tail effects. The tail effects wastes radio resources and the user endpoint device's energy.

SUMMARY

In one embodiment, the present disclosure teaches a method, computer readable medium and apparatus for performing a demotion in a cellular communications network. In one embodiment, the method comprises receiving a packet indicating that a batching transfer is completed, determining if a background packet was received after receiving the packet indicating that the batching transfer is completed and demoting a state of a state machine implemented by a radio network controller to a lower state if the background packet was not received.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
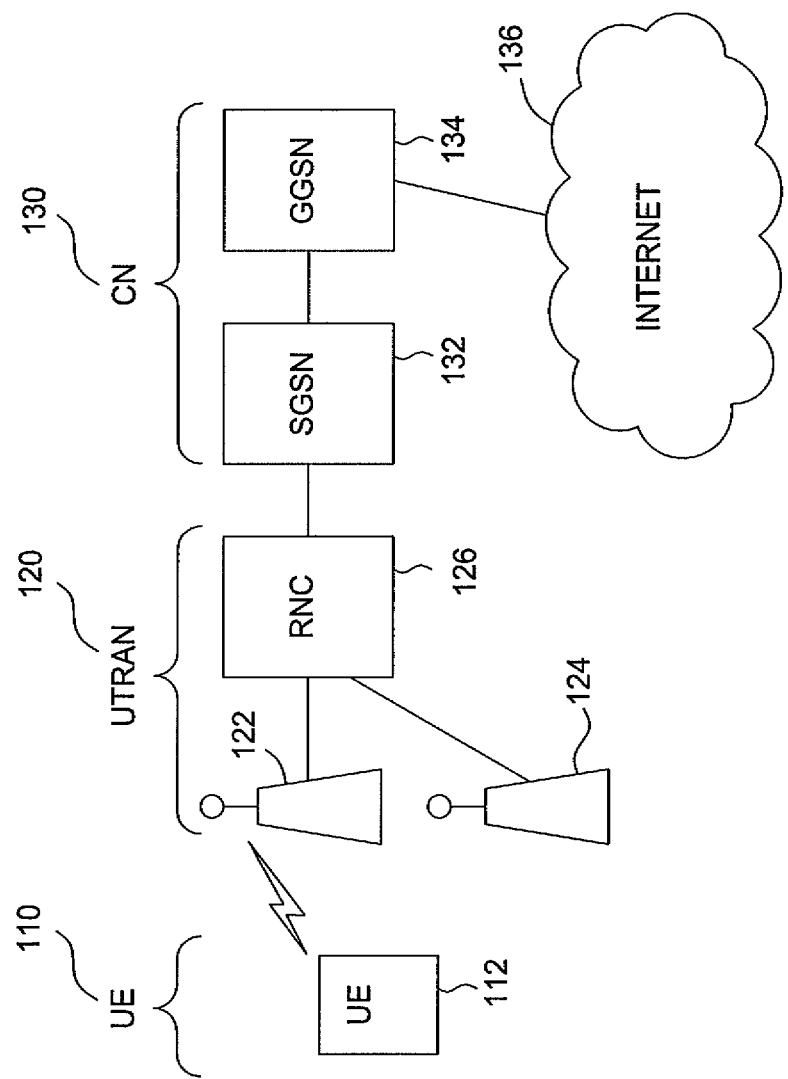
FIG. 1 illustrates one example of a cellular communications network architecture.

The present disclosure broadly discloses a method, computer readable medium and an apparatus for performing a demotion in a cellular communications network. FIG. 1 is a block diagram depicting one example of a cellular communications network 100 related to the current disclosure. In one embodiment, the cellular communications network may be a 3G cellular network such as a universal mobile telecommunications system (UMTS) network. However, it should be noted that the cellular communications network 100 may include other types of cellular communications networks such as general packet radio services (GPRS) networks, global system for mobile communication (GSM) networks or enhanced data rates for GSM evolution (EDGE) network by substituting the appropriate hardware and/or hardware configurations for the respective networks.

FIG. 1 is a block diagram depicting an exemplary cellular communications network 100 related to the current disclosure. In one embodiment, the network 100 includes three subsystems comprising a user equipment (UE) subsystem 110, a UMTS terrestrial radio access network (UTRAN) subsystem 120 and a core network 130.

In one embodiment, the UE subsystem 110 includes one or more user endpoint devices 112. The user endpoint devices 112 may include a mobile telephone, a smart phone, a messaging device, a tablet computer, a laptop computer, an air card and the like. The user endpoint devices 112 may communicate wirelessly with the cellular communications network 100.

In one embodiment, the UTRAN subsystem 110 includes one or more base stations 122 and 124 and a radio network controller (RNC) 126. The UTRAN subsystem 110 provides connectivity between the user endpoint devices 112 and the core network 130. The UTRAN subsystem 110 provides features such as packet scheduling, radio resource control (RRC) and handover control via the RNC 126.

In one embodiment, the core network 130 includes a serving GPRS support node (SGSN) 132, a gateway GPRS support node (GGSN) 134 and the internet 136. The GGSN 134 serves as a gateway hiding UMTS internal infrastructures from an external network.

The core network 130 is the backbone of the cellular communications network 100. It should be noted that although various numbers of hardware equipment is illustrated that the numbers illustrated should not be limiting. For example, although two base stations 122 and 124 are illustrated the network 100 may include any number of base stations. Moreover, the cellular communications network 100 may also include additional hardware or network components that are not illustrated. In other words, FIG. 1 illustrates a simplified cellular communications network 100.

Figure 2:
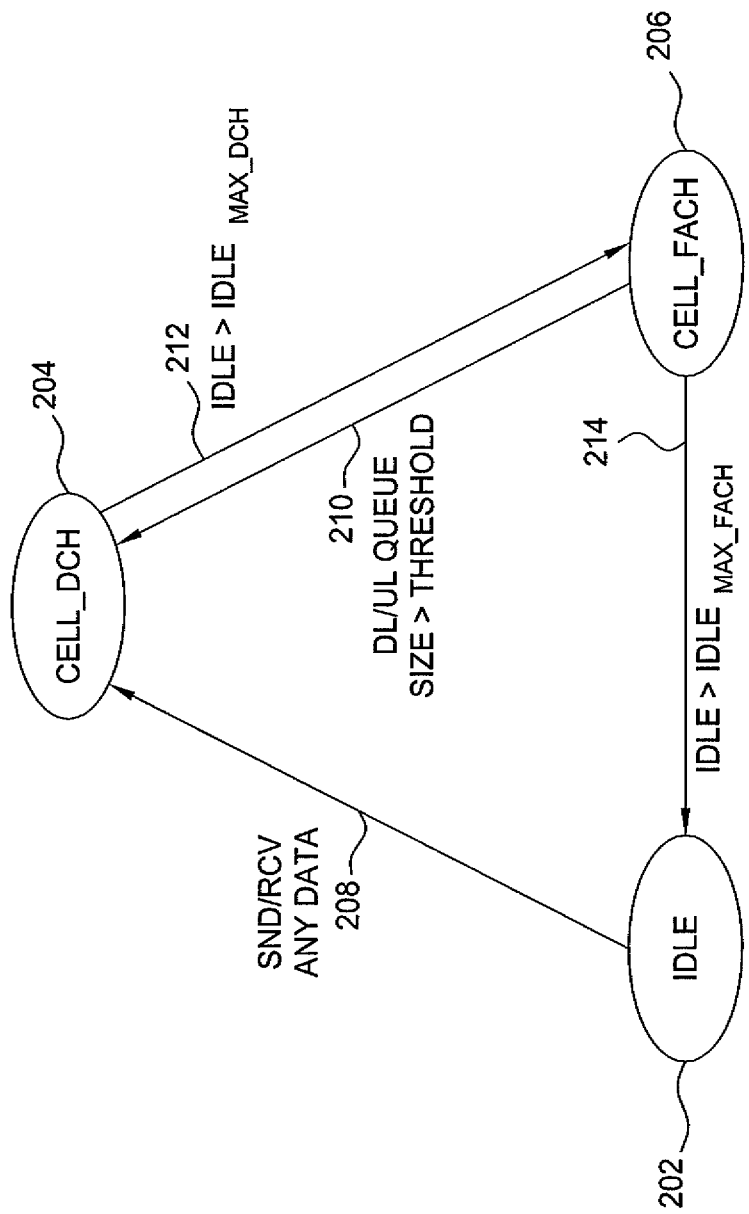
FIG. 2 illustrates one example of a radio resource control state machine.

In one embodiment, the RNC 126 may implement a state machine. FIG. 2 illustrates one example of an RRC state machine 200 implemented by the RNC 126. It should be noted that the RRC state machine 200 is only one example of a state machine used in the cellular communications network 100. The embodiments of the present disclosure may be equally applicable to other variations of RRC state machines. A brief discussion of the RRC state machine 200 will be helpful in defining what is meant by a promotion, a demotion and a lower state.

The RRC state machine 200 comprises three states; an idle state 202, a CELL_DCH state 204 and a CELL_FACH state 206. In one embodiment, the idle state 202 is a default state wherein no radio resources are allocated and the user endpoint device 112 cannot transfer any data. Little to no energy is consumed by the user endpoint device 112 in the idle state 202.

In one embodiment, the CELL_DCH state 204 is the highest speed of data transfer, provides the maximum bandwidth and has the highest amount of energy consumption. An RRC connection is established and the user endpoint device 112 is allocated dedicated transport channels in both a downlink and an uplink direction.

In one embodiment, the CELL_FACH state 206 is a lower level of access and consumes less energy than the CELL_DCH state 204. An RRC connection is established, but there is no dedicated channel allocated to the user endpoint device 112. Instead, the user endpoint device 112 can only transmit data through shared low-speed channels.

In the RRC state machine 200, promotions and demotions may occur between the idle state 202, the CELL_DCH state 204 and the CELL_FACH state 206. For example, a promotion may be defined as moving to a higher level of access, e.g., from the idle state 202 to the CELL_DCH state 204 or from the CELL_FACH state 206 to the CELL_DCH state 204. For example, a demotion may be defined as moving to a lower level of access, e.g., from the CELL_DCH state 204 to the CELL_FACH state 206 or from the CELL_FACH state 206 to the idle state 202.

FIG. 2 illustrates how promotions and demotions may occur. For example, when in the idle state 202, when any data is sent or received, a promotion may occur to the CELL_DCH state 204. This is illustrated by line 208. Alternatively, when in the CELL_FACH state 206 if the downlink or uplink queue size is greater than a predetermined threshold, a promotion may occur to the CELL_DCH state 204. This is illustrated by line 210.

However, when in the CELL_DCH state 204, an amount of idle time exceeds a maximum DCH idle time, $IDLE_{MAX\_DCH}$ or $\alpha$, (e.g., 5 seconds) then a demotion may occur to the CELL_FACH state 206. This is illustrated by line 212. Alternatively, when in the CELL_FACH state 206 if the amount of idle time exceeds a maximum FACH idle time, $IDLE_{MAX\_FACH}$ or $\beta$, (e.g. 12 seconds) then a demotion may occur to the idle state 202. This is illustrated by line 214.

It should be noted that the CELL_DCH idle time and the CELL_FACH idle time may be set to any amount of time. The times are provided only as examples and should not be considered limiting.

State machine promotions and demotions increase the management overhead of the RNC 126 and worsen the user experience. State machine promotions and demotions have a particularly negative performance impact on short sessions. One way to reduce the management overhead caused by state machine promotions and demotions is to increase the values of the inactivity times (e.g. the idle timers). However, this decreases utilization at a particular state (e.g. CELL_DCH or CELL_FACH) due to tail effects.

A tail may be defined as a time period of a constant duration of an inactivity timer before a state demotion. The time period in the tail can never be used to transfer user data, otherwise the new traffic would reset the timer without causing a demotion.

One way to address the tail effects is to create state-machine aware applications, e.g., batching and prefetching. For delay-tolerant applications such as email and RSS feeds, their transmission can be batched to reduce the tail time. For example, consider two delay-tolerant sessions $S_1$ and $S_2$ with the same size and duration and let $\alpha$ be the CELL_DCH idle timer. In one extreme case, if $S_2$ starts $\alpha$ seconds after $S_1$ finishes, then it maximizes the total CELL_DCH tail to be $2\alpha$. In the other extreme, the tail reaches the minimal value of $\alpha$ if both sessions terminate simultaneously (i.e. perfectly batched).

Prefetching can be regarded as a special type of batching. For example, consider a scenario of web searching. It is reported that 40% of the time a user requests the first document in the search results provided by the search engine. Therefore, the user endpoint device 112 can avoid the tail caused by users' idle time with high probability by prefetching the top search results.

Referring back to the batching example, the lower bound of a state's tail by the traditional approach is $\alpha$ when $S_1$ and $S_2$ terminate simultaneously so they share the same tail. Notably, the batching transfers do not involve user interactions. So the user endpoint device 112 has precise knowledge of their termination time. In contrast, inactivity timers or idle timers are necessary for normal (non-batchable) transfers since the cellular communications network 100 does not know the inter-arrival time of the packets. This implies that if the user endpoint device 112 can properly mark the end of a batching transfer, its tail can be completely avoided by the RNC 126, which then demotes the state immediately when being notified.

Embodiments of the present disclosure provide a state-machine-aware application protocol for the cellular communications network 100. The present state-machine-aware application protocol can be directly patched on existing batching and prefetching approaches. In one embodiment, the state-machine-aware application protocol can be implemented by a processor of the RNC 126.

In addition, the state-machine-aware application of the present disclosure considers the existence of background packets and foreground packets. Foreground packets may be defined as those packets that participate in the batching process. Background packets may be defined as those packets that are not part of the batching process.

Previously implemented state-machine-aware application protocols did not consider the existence of background packets. As a result, the previously implemented state-machine-aware application protocols could execute a demotion of the state machine too early even though other background packets were still being sent or received. As a result, the transmission of background packets could be interrupted. This would significantly degrade the user's experience.

The design of the state-machine-aware application protocols disclosed herein includes two components; an online scheduler and a new batching protocol between the user endpoint devices 112 and the RNC 126. The online schedule determines what and when to do batching based on the arrival time and the deadline of incoming batching requests (e.g., the deadline of an email sending request is 5 minutes after its arrival time).

The new batching protocol achieves more tail time savings. The user endpoint device 112 labels uplink packets into three types of packets. An "N" packet is a normal "non-batching" packet. In other words, the N packets may be considered the background packets. A "B" packet is a packet belonging to a batching transfer. In other words, the B packet may be considered a foreground packet. A "T" packet is a special packet that indicates the current batching transfer is over. It should be noted, that the labels "N", "B" and "T" are arbitrary and any label may be used for the different types of packets such as the background packets (e.g., non-batched packets), the foreground packets (e.g., batched packets) and the special packet indicating completion of a batching transfer.

In one embodiment, all downlink packets are treated as N packets so the state-machine-aware application protocol is transparent to servers outside of the cellular communications network 100. In one embodiment, when the RNC 126 receives an N or B packet, the RNC 126 executes a default state transition policy. However, when the RNC 126 receives a T packet, the RNC 126 may execute a special state transition policy based upon the novel state-machine-aware application protocol described herein.

Figure 3:
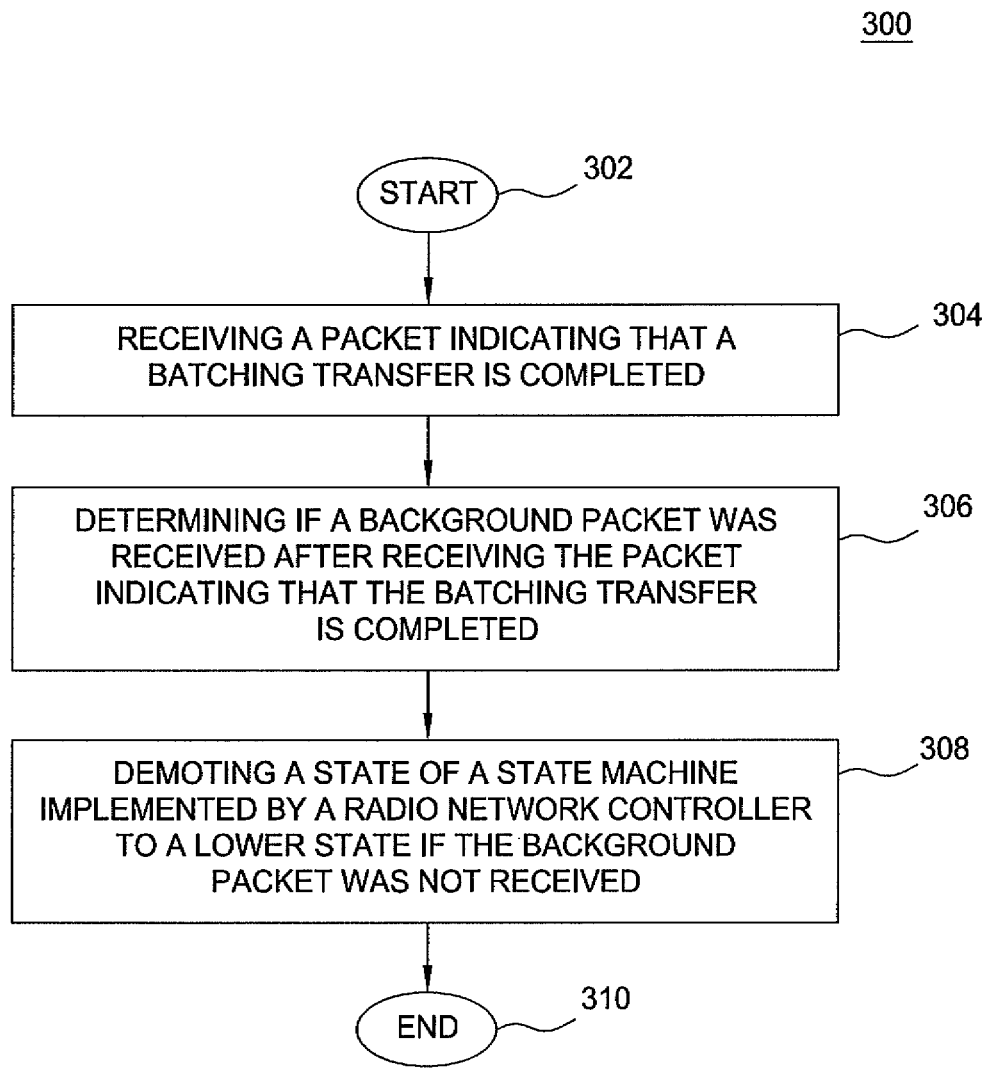
FIG. 3 illustrates a flowchart of a method for performing a demotion in a cellular communications network.

FIG. 3 illustrates a high level flowchart of a method 300 for performing a demotion in a cellular communications network in accordance with the state-machine-aware application protocol described above. In one embodiment, the method 300 may be implemented by the RNC 126 or a general purpose computer having a processor, a memory and input/output devices as discussed below with reference to FIG. 5.

The method 300 begins at step 302. At step 304, the method 300 receives a packet indicating that a batching transfer is completed. As discussed above, the packet may be a "T" packet.

At step 306, the method 300 determines if a background packet was received after receiving the packet indicating that the batching transfer is completed. As discussed above, the background packet may be an "N" packet. In one embodiment, step 306 may be executed by determining if a background packet was ever received. In another embodiment, step 306 may be executed by determining if a background packet was received within a predefined time period. In yet another embodiment, step 306 may include both determining if a background packet was ever received and if a background packet was received within a predefined time period.

The time period may be the idle timers associated with each state of the state machine. As discussed above, the CELL_DCH state may have a predefined idle time of $IDLE_{MAX\_DCH}$ or a before the CELL_DCH state is demoted and the CELL_FACH state may have a predefined idle time of $IDLE_{MAX\_FACH}$ or β before the CELL_FACH state is demoted. How the predefined time periods are used are discussed in further detail below with reference to FIG. 4.

At step 308, the method 300 demotes a state of a state machine implemented by a radio network controller (e.g., the RNC 126) to a lower state if the background packet was not received. As discussed above, a lower state may be defined as a state that provides lower access than a current state. For example, a lower state of the CELL_DCH state may be the CELL_FACH state or the idle state and a lower state of the CELL_FACH state may be the idle state.

As a result, when the packet indicating that a batching transfer is completed is received and no background packet was received (e.g., either never received or not received within a predefined time period) the RNC 126 may immediately demote the state of the state machine without risk of interrupting a transmission of other background packets. In other words, the state-machine-aware application protocol of the present disclosure takes into account of packets of background applications before determining whether or not to execute a demotion. The method 300 ends at step 310.

Figure 4:
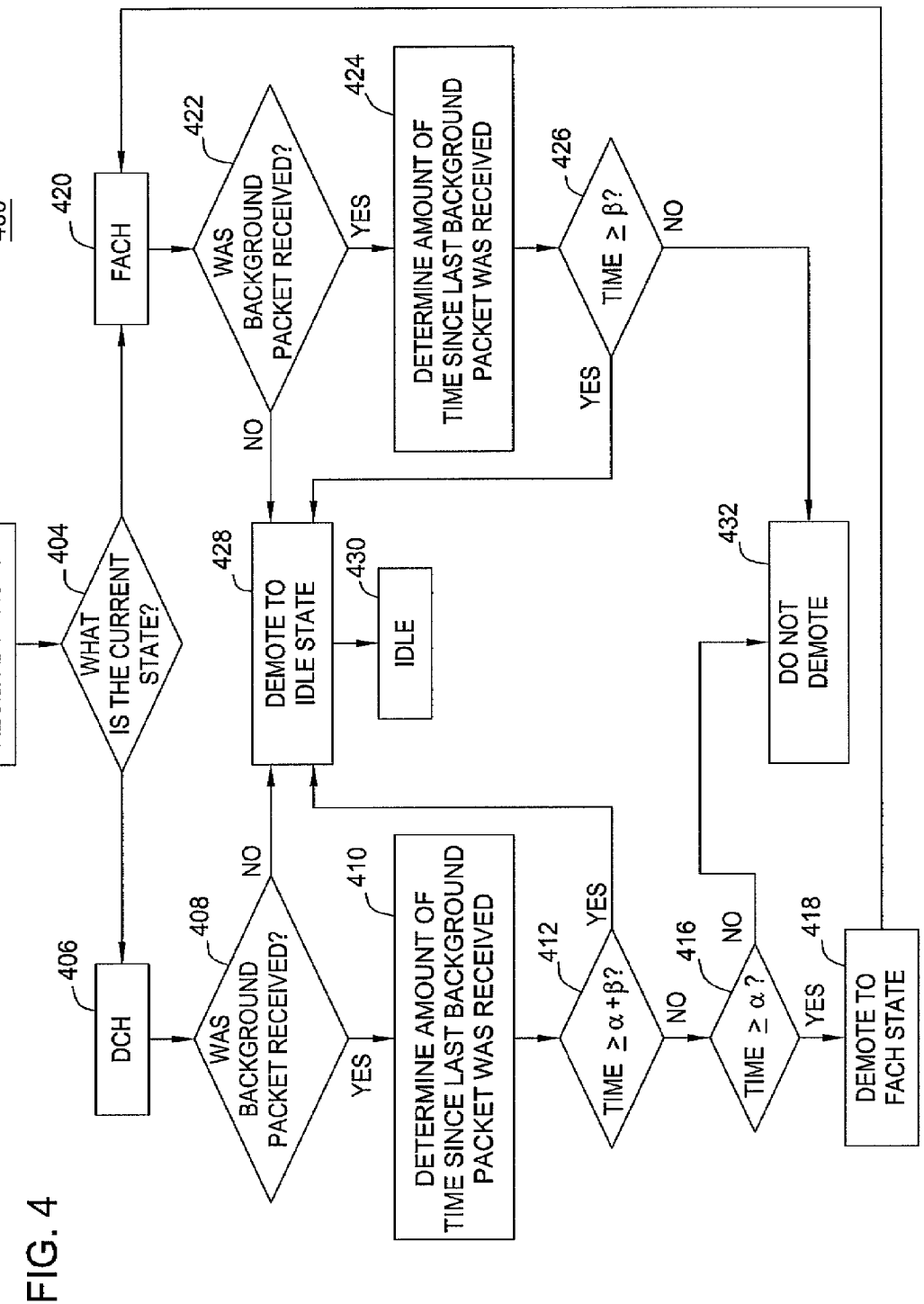
FIG. 4 illustrates a more detailed flowchart of a method for performing a demotion in a cellular communications network.

FIG. 4 illustrates a detailed flowchart of a method 400 for performing a demotion in a cellular communications network in accordance with the state-machine-aware application protocol described above. In one embodiment, the method 400 may be implemented by the RNC 126 or a general purpose computer having a processor, a memory and input/output devices as discussed below with reference to FIG. 5.

The method 400 begins at step 402 when a "T" packet is received. As discussed above, the T packet is a special packet indicating that a current batching transfer is completed.

At step 404, the method 400 determines what the current state is. If the current state is CELL_FACH, the method 400 proceeds to step 420. At step 420, the method 400 is in the CELL_FACH state.

Then the method proceeds to step 422 to determine if a background packet was ever received. For example, the background packet may be an "N" packet discussed above that is not part of a batch process. If no background packet was ever received, the method 400 proceeds to step 428 where the state is demoted to an idle state. Then the method 400 proceeds to step 430 where the state machine is now in an idle state and the method 400 ends.

However, if a background packet was received at step 422, then the method proceeds to step 424. At step 424, the method 400 determines an amount of time since the last background packet was received.

After determining the amount of time since the last background packet was received, the method 400 proceeds to step 426. At step 426, the method 400 determines if the amount of time determined from step 424 is greater than or equal to a predefined time period β (e.g., 12 seconds). As discussed above, β or $IDLE_{MAX\_FACH}$ may be the predefined idle time before the CELL_FACH state is demoted to the idle state.

If the answer to step 426 is no, then the method 400 proceeds to step 432 where no demotion occurs. This is because a background packet was detected too recently. As a result, demoting the state machine may interrupt an ongoing transmission of background packets of a background application. The method ends at step 432.

However, at step 426 if the answer is yes, then the method 400 proceeds to step 428 where the state is demoted to an idle state. This is because it is assumed that any background applications are completed if the background packet was last received at a time greater than the predefined time period β. Then the method 400 proceeds to step 430 where the state machine is now in an idle state and the method 400 ends.

Referring back to step 404, if the state is the CELL_DCH state, then the method 400 proceeds to step 406. At step 406, the method 400 is in the CELL_DCH state.

Then the method 400 proceeds to step 408 to determine if a background packet was received. As noted above, the background packet may be an "N" packet that is not part of a batch process. If no background packet was ever received, the method 400 proceeds to step 428 where the state is demoted to an idle state. Then the method 400 proceeds to step 430 where the state machine is now in an idle state and the method 400 ends.

However, if a background packet was received, the method 400 proceeds to step 410. At step 410, the method 400 determines an amount of time since the last background packet was received.

After determining the amount of time since the last background packet was received, the method 400 proceeds to step 412. At step 412, the method 400 determines if the amount of time determined from step 410 is greater than or equal to a predefined time period α (e.g. 5 second)+β (e.g., 12 seconds). As discussed above, α or $IDLE_{MAX\_DCH}$ may be the predefined idle time before the CELL_DCH state is demoted to the CELL_FACH state or idle state. The predefined time period α+β includes both the CELL_DCH predefined idle time and the CELL_FACH predefined idle time.

At step 412 if the answer is yes, then the method 400 proceeds to step 428 where the state is demoted to an idle state. This is because it is assumed that any background applications are completed if the background packet was last received at a time greater than the predefined time period α+β. Then the method 400 proceeds to step 430 where the state machine is now in an idle state and the method 400 ends.

However, if the answer at step 412 is no, the method 400 proceeds to step 416. At step 416, the method 400 determines if the amount of time determined from step 410 is greater than a predefined time period α (e.g. 5 second). If the answer to step 416 is no, then the method 400 proceeds to step 432 where no demotion occurs. This is because a background packet was detected too recently. As a result, demoting the state machine may interrupt an ongoing transmission of background packets of a background application. The method ends at step 432.

However, if the answer to step 416 is yes, the method 400 proceeds to step 418 where the state is demoted to the CELL_FACH state. Then the method 400 proceeds to step 420, where the method 400 is in the CELL_FACH state and proceeds accordingly as discussed above.

The above described state-machine-aware application protocol methods could be used to maliciously send many T packets in a short period, thus creating a large number of state promotions or demotions. In one embodiment, this may be prevented by treating duplicated T packets within a predefined time period (e.g., 1 minute) as meaningless N packets. In other words, multiple T packets within the predefined time period will be considered by the RNC 126 as only a single T packet.

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in FIGS. 3 and 4 that recite a determining operation, or involve a decision, do not necessarily require that both branches of the determining operation be practiced. In other words, one of the branches of the determining operation can be deemed as an optional step.

Figure 5:
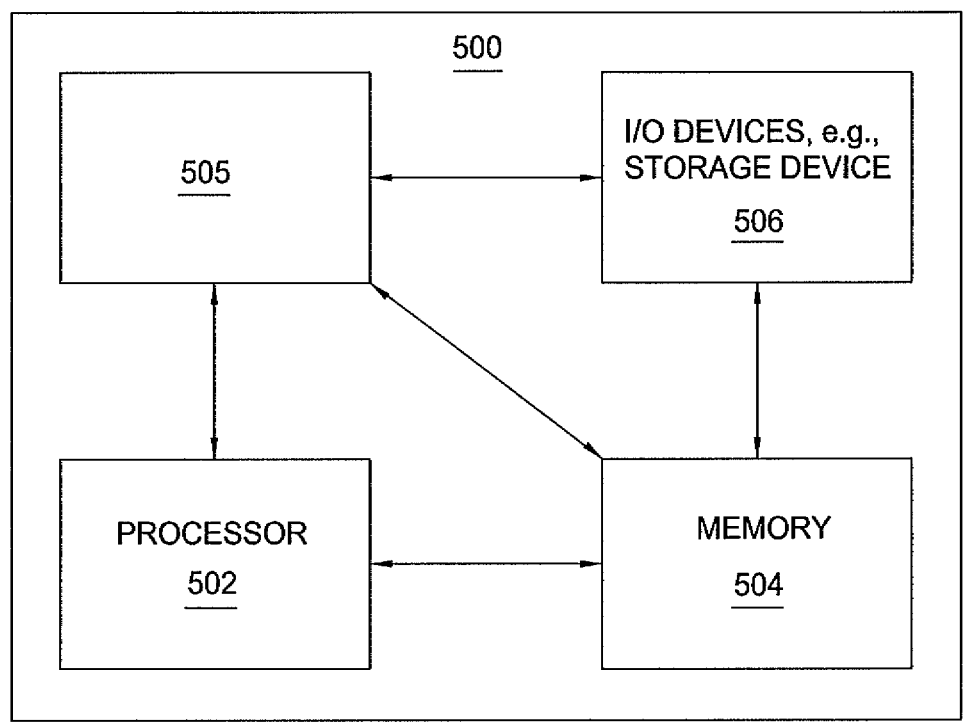
FIG. 5 illustrates a high-level block diagram of a general-purpose computer suitable for use in performing the functions described herein.

FIG. 5 depicts a high-level block diagram of a general-purpose computer suitable for use in performing the functions described herein. As depicted in FIG. 5, the system 500 comprises a processor element 502 (e.g., a CPU), a memory 504, e.g., random access memory (RAM) and/or read only memory (ROM), a module 505 for performing a demotion in a cellular communications network, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or any other hardware equivalents. In one embodiment, the present module or process 505 for performing a demotion in a cellular communications network can be loaded into memory 504 and executed by processor 502 to implement the functions as discussed above. As such, the present method 505 for performing a demotion in a cellular communications network (including associated data structures) of the present disclosure can be stored on a computer readable storage medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for performing a demotion in a cellular communications network, comprising:
    receiving, by a processor, a packet indicating that a batching transfer is completed;
    determining, by the processor, if a background packet was received after receiving the packet indicating that the batching transfer is completed, wherein the background packet is different from a foreground packet, wherein the background packet comprises a packet that is not part of the batch transfer and the foreground packet is a packet that is part of the batch transfer; and
    demoting, by the processor, a state of a state machine implemented by a radio network controller to a lower state if the background packet was not received.

2. The method of claim 1, further comprising:
    determining a current state.

3. The method of claim 2, further comprising:
    when the current state is a CELL_DCH state, determining whether the background packet was received within a predefined time period; and
    demoting to the lower state if the background packet was received in a time greater than the predefined time period.

4. The method of claim 3, wherein the predefined time period comprises a combination of a max idle time of the CELL_DCH state and a max idle time of a CELL_FACH state and wherein the lower state comprises an idle state.

5. The method of claim 3, wherein the predefined time period comprises a max idle time of the CELL_DCH state and wherein the lower state comprises a CELL_FACH state.

6. The method of claim 2, further comprising:
    when the current state is a CELL_FACH state, determining whether the background packet was received within a predefined time period; and
    demoting to the lower state if the background packet was received in a time greater than the predefined time period.

7. The method of claim 6, wherein the predefined time period comprises a max idle time of the CELL_FACH state and wherein the lower state comprises an idle state.

8. A non-transitory computer-readable medium storing a plurality of instructions which, when executed by a processor, cause the processor to perform operations for performing a demotion in a cellular communications network, the operations comprising:
    receiving a packet indicating that a batching transfer is completed;
    determining if a background packet was received after receiving the packet indicating that the batching transfer is completed, wherein the background packet is different from a foreground packet, wherein the background packet comprises a packet that is not part of the batch transfer and the foreground packet is a packet that is part of the batch transfer; and
    demoting a state of a state machine implemented by a radio network controller to a lower state if the background packet was not received.

9. The non-transitory computer-readable medium of claim 8, further comprising:
    determining a current state.

10. The non-transitory computer-readable medium of claim 9, further comprising:
    when the current state is a CELL_DCH state, determining whether the background packet was received within a predefined time period; and
    demoting to the lower state if the background packet was received in a time greater than the predefined time period.

11. The non-transitory computer-readable medium of claim 10, wherein the predefined time period comprises a combination of a max idle time of the CELL_DCH state and a max idle time of a CELL_FACH state and wherein the lower state comprises an idle state.

12. The non-transitory computer-readable medium of claim 10, wherein the predefined time period comprises a max idle time of the CELL_DCH state and wherein the lower state comprises a CELL_FACH state.

13. The non-transitory computer-readable medium of claim 9, further comprising:
when the current state is a CELL_FACH state, determining whether the background packet was received within a predefined time period; and
demoting to the lower state if the background packet was received in a time greater than the predefined time period.

14. The non-transitory computer-readable medium of claim 13, wherein the predefined time period comprises a max idle time of the CELL_FACH state and wherein the lower state comprises an idle state.

15. An apparatus for performing a demotion in a cellular communications network, comprising:
a processor; and
a computer-readable medium storing a plurality of instructions which, when executed by the processor, cause the processor to perform operations, the operations comprising:
receiving a packet indicating that a batching transfer is completed;
determining if a background packet was received after receiving the packet indicating that the batching transfer is completed, wherein the background packet is different from a foreground packet, wherein the background packet comprises a packet that is not part of the batch transfer and the foreground packet is a packet that is part of the batch transfer; and
demoting a state of a state machine implemented by a radio network controller to a lower state if the background packet was not received.

16. The apparatus of claim 15, further comprising:
determining a current state.

17. The apparatus of claim 16, further comprising:
when the current state is a CELL_DCH state, determining whether the background packet was received within a predefined time period; and
demoting to the lower state if the background packet was received in a time greater than the predefined time period.

18. The apparatus of claim 17, wherein the predefined time period comprises a combination of a max idle time of the CELL_DCH state and a max idle time of a CELL_FACH state and wherein the lower state comprises an idle state.

19. The apparatus of claim 17, wherein the predefined time period comprises a max idle time of the CELL_DCH state and wherein the lower state comprises a CELL_FACH state.

20. The apparatus of claim 16, further comprising:
when the current state is a CELL_FACH state, determining whether the background packet was received within a predefined time period comprising a max idle time of the CELL_FACH state; and
demoting to an idle state if the background packet was received in a time greater than the predefined time period.

* * * * *